UNITED STATES PATENT OFFICE.

WILLIAM OPPENHEIMER, OF EWELL, ENGLAND.

LIQUID SUITABLE AS A SOLVENT AND AS A COMBUSTIBLE FOR INTERNAL-COMBUSTION ENGINES AND PROCESS OF MAKING THE SAME.

No. 832,409.　　　　　　Specification of Letters Patent.　　　　　Patented Oct. 2, 1906.

Application filed April 22, 1904. Serial No. 204,363.

*To all whom it may concern:*

Be it known that I, WILLIAM OPPENHEIMER, a subject of the King of Great Britain and Ireland, residing at Ewell, in the county of Surrey, England, (whose post-office address is Ewell Castle, Surrey, England,) have invented a certain new and useful Process for the Manufacture of a New Spirituous Fluid Suitable as a Solvent and a Combustible Liquid for Working Internal-Combustion Engines, (for which I have applied for a patent in Great Britain on the 20th of February, 1904; in Germany on the 29th of February, 1904; in Austria on the 29th of February, 1904; in Belgium on the 5th of March, 1904; in Hungary on the 7th of March, 1904, and in France on the 7th of March, 1904,) of which the following is a specification.

The materials usually employed for carbureting water-gas are hydrocarbons derived from petroleum, and the usual method consists in exposing the atomized hydrocarbons to a high temperature involving chemical changes in their composition. The heavier particles of the carbureting mixture treated as described which are capable of condensation are condensed on cooling and purifying and form what is known as "water-gas" tar, while the gasified constituents of the carbureting medium remain mixed with the water-gas. Hitherto water-gas tar has not found a suitably-remunerative application, instead of which it constitutes a rather troublesome by-product, partly because owing to the water contained in the same it cannot be distilled without strong ebullition and violent shocks, which renders the distillation in retorts impracticable. In consequence of these defects only moderate quantities of water-gas tar have hitherto been converted into pitch by heating it in large open receptacles and allowing the volatile products to escape. In the absence of a better method of utilization it is employed also as a fuel.

I have discovered that a highly valuable product suitable as a solvent or vehicle for many substances and for other industrial purposes may be obtained from water-gas tar, which product no longer resembles the known petroleum distillates as regards its properties, but constitutes a perfectly new material which is not directly obtainable either from petroleum or from the kinds of tar hitherto worked up for industrial purposes.

For obtaining the new product from water-gas tar the latter is first dehydrated, preferably by the process described in my application for patent Serial No. 171,012, dated August 27, 1903, and which consists in abstracting the water from the tar by mixing it with substances, such as caustic lime or burnt gypsum, which chemically combine with water, then allowing the mixture to stand, and then mechanically separating the tar from the precipitate. Subsequently the tar may be distilled in retorts without danger. For this purpose an ordinary retort-still with a hood and condensing-coil may be used, which latter is preferably mounted in a tank filled with cold water. The distillation is preferably continued until the residue consists of pitch only, and the crude distillate constitutes the raw material from which the desired product may be separated. For this purpose the distillate is treated by agitation with acid, preferably sulfuric acid. Subsequently after having been decanted from the acid which has subsided to the bottom, it is treated with alkali, and the product subjected to distillation.

The quantity of sulfuric acid which should be added to the crude distillate, as mentioned above, is ascertained by a preliminary experiment with a sample of the crude distillate—that is to say, an experiment or a series of experiments is made to ascertain what quantity of acid is required to insure that after treatment of the sample with the acid and subsequent treatment with concentrated solution of sodium carbonate the distillation of the sample yields at first a perfectly clear and colorless distillate. In most cases it is sufficient to use a quantity of sulfuric acid equal in weight to about one and one-half per cent. of the weight of the crude distillate. The acid is carefully mixed with the distillate by stirring for about half an hour, after which the product is allowed to settle. Subsequently the liquid lying over the acid situated at the bottom of the receptacle is drawn off into another receptacle, an excess of concentrated solution of sodium carbonate (or of caustic soda) is added, the mixture is stirred, then allowed to settle, and the sodium-carbonate solution settled at the bottom is drawn off. The liquid drawn off is now distilled. What passes over first (first runnings) is a perfectly clear and colorless distillate amounting to from ten to fifty per cent. of the liquid, according to the quality of the crude gas-tar used as a raw material, and is separately collected. As soon as the distillate passes over with yellowish color and oily consistency it is conducted to another receiver as second runnings, and the distillation is continued until there remains in the retort or still a residue which is sufficiently consistent to be applicable as black cylinder-lubricating oil. The yellowish distillate (second runnings) is again treated with acid; then after subsidence and decantation by alkali and redistilled, whereby again a colorless liquid is produced, which may be added to the colorless first runnings.

The new product obtained from water-gas tar in the manner described is a clear and colorless liquid, and its specific gravity is approximately between 0.820 and 0.900, while the different varieties of benzin or petroleum spirit possess, as is well known, specific gravities varying between 0.662 and 0.750. As regards its solvent power, the new product differs also materially from the known petroleum distillates, dissolving, as it does, many substances which are not dissolved by the latter. It is free or almost free from sulfur and phenols, its boiling temperature is approximately between 100° and 240° centigrade, and it contains toluene, ortho-, meta-, and para-xylene, mesitylene, and a trace of naphthalene; but the bulk of it consists of hydrocarbons, the chemical nature of which has not yet been elucidated. In comparison with other petroleum spirits it possesses the important advantage that its flash-point is considerably higher, being about 79° Fahrenheit.

The new product is eminently suitable for the manufacture of varnish and coloring-matters, also in the textile trades—for instance, for cleaning wool, as a solvent for india-rubber, gum, resin, and other materials, and as a combustible liquid for working internal-combustion engines.

What I claim is—

1. The process for obtaining from water-gas tar a spirituous fluid suitable as a solvent and for other industrial purposes, which consists in subjecting the dehydrated tar to distillation until only pitch remains, condensing the vapors distilled off, treating the distillate with an acid and subsequently with an alkali, subjecting the product to distillation and the resulting vapors to condensation, and when the distillate tends to become yellow and oily, collecting what follows (viz: the second runnings) in a receiver separately from the colorless first runnings, then treating the second runnings again with acid, then with alkali, and subjecting the resulting product to distillation and condensation, substantially as described.

2. As a new article of manufacture, a clear colorless and combustible liquid having a specific gravity between 0.820 and 0.900, a boiling-point between 100° and 240°, and a flashing temperature of about 79° Fahrenheit, the said liquid being a mixture of hydrocarbons free or almost free from sulfur, free from phenols, capable of dissolving india-rubber, gum and resin and obtainable from water-gas tar by the process described.

In witness whereof I have signed this specification in the presence of two subscribing witnesses.

WILLIAM OPPENHEIMER.

In presence of—
H. D. JAMESON,
F. L. RAND.